July 9, 1968

V. J. BURZAN 3,392,235

PHOTOGRAPHIC RECORDING APPARATUS HAVING
BELT DRIVE FOR SPROCKETLESS FILM

Filed Oct. 14, 1964

INVENTOR.
VERNON J. BURZAN
BY
Carl Fissell Jr.
AGENT

INVENTOR.
VERNON J. BURZAN
AGENT

INVENTOR.
VERNON J. BURZAN

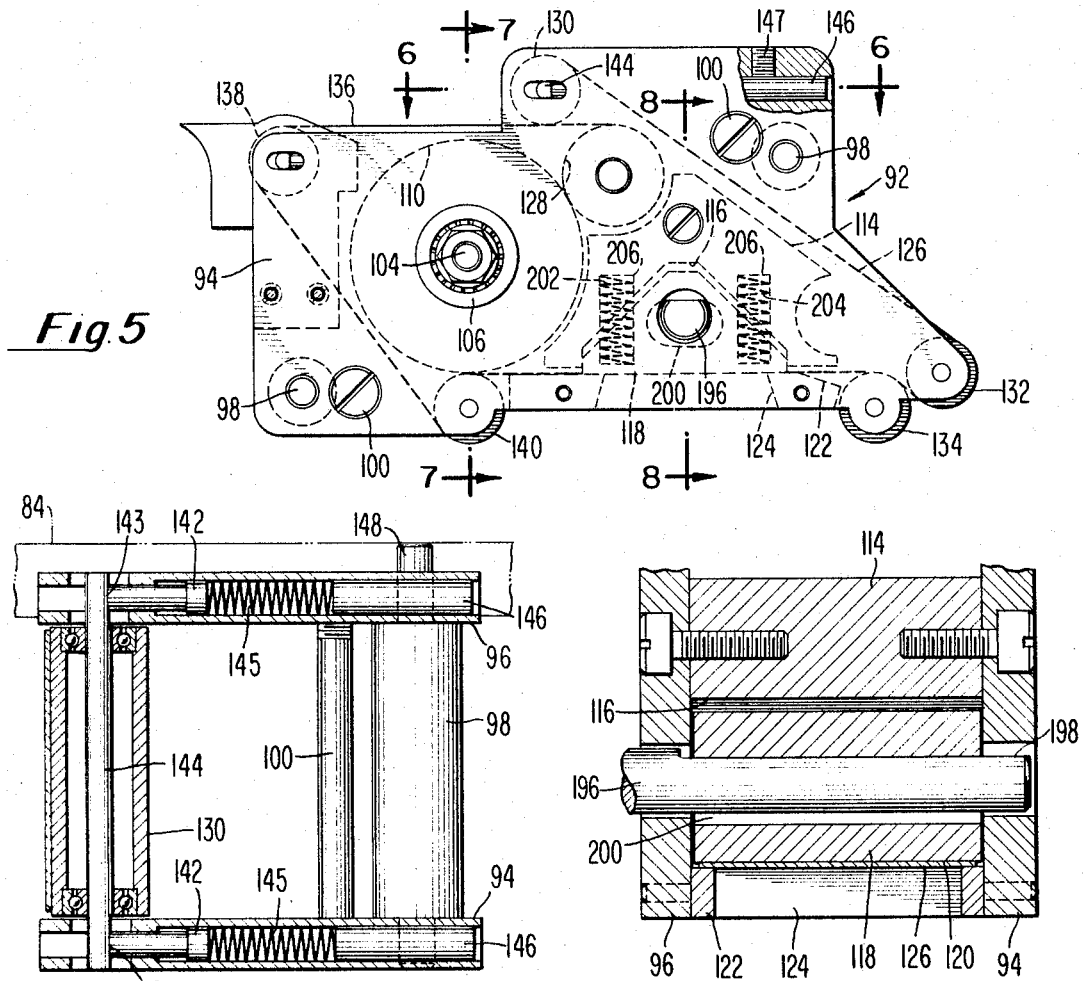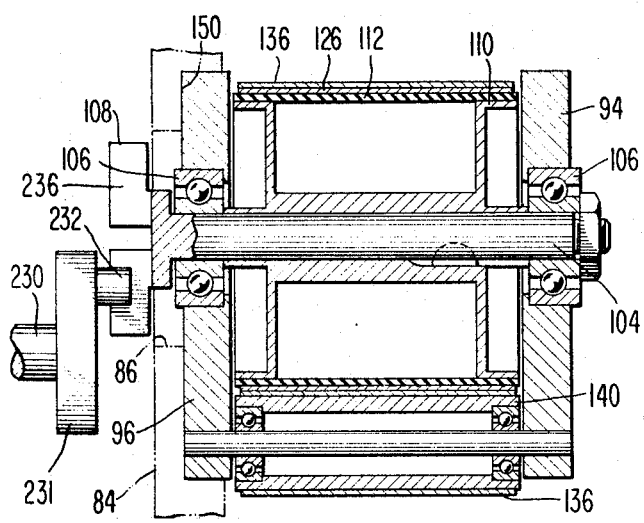

United States Patent Office 3,392,235
Patented July 9, 1968

3,392,235
PHOTOGRAPHIC RECORDING APPARATUS HAVING BELT DRIVE FOR SPROCKETLESS FILM
Vernon J. Burzan, Dexter, Mich., assignor to Burroughs Corporation, Detroit, Mich., a corporation of Michigan
Filed Oct. 14, 1964, Ser. No. 403,824
14 Claims. (Cl. 178—6.7)

ABSTRACT OF THE DISCLOSURE

This invention relates to shutterless photographic film recording apparatus having sprocketless film transport mechanism wherein the film is linearly entrained between confronting endless strips, webs or belts in area contact therewith so as to be conjointly moved thereby into and out of an area adjacent a photographic exposure aperture at high speed in stop-start fashion.

---

The present invention relates to recording apparatus, and more particularly, although not necessarily exclusively, to recording apparatus of the photographic type. With still more specificity, the present apparatus has to do with a photographic recording mechanism of the shutterless type wherein photographic film without sprocket holes is moved by means of an endless carrier to an exposure aperture or gate in a manner effective to produce an instantaneous recording of the desired subject matter. Still more particularly, the invention has to do with the utilization of a pair of endless strips, webs or belts between which photographic recording film is entrained and conjointly moved into an exposure aperture thereby to provide accurate and positive incremental advancement of the film permitting discrete photographic exposures to be made at relatively high speed in stop-start fashion.

It is an important object of the present invention therefore to provide a novel photographic recording camera utilizing film advance or drive techniques not heretofore employed in this art.

Another object of the invention is to provide a novel shutterless photographic recording camera.

Still a further object of the invention is to provide a sprocketless film drive enabling instantaneous incremental exposure of photographic film without mechanical engagement and disengagement of the drive means with the film per se.

A further object of the invention is the provision of an endless web or belt-type film advance drive mechanism for a recording camera.

Another object of the invention is the provision of means providing synchronous relative movement between the film and the exposure aperture pressure pad avoiding out of focus exposures and permitting frame by frame exposure and advancement of the film without abrasion or wear to the film itself.

It is another object of the invention to provide a shutterless recording camera employing sprocketless photographic film in a manner permitting substantially all the useful recording emulsion carrying area thereof to be utilized.

In accordance with the foregoing objects and first briefly described, the present invention comprises a light-tight enclosure having a film gate or exposure aperture across which sprocketless photographic emulsion bearing film is adapted to be passed in instantaneous start-stop movement by means of a pair of tensioned webs or belt-like members which are adapted to entrain the emulsion bearing film therebetween and to advance the same as called for by associated signal apparatus thereby permitting the film to move in desired increments into and out of the exposure area. The apparatus further includes an adjustable, synchronously movable, film aperture pressure shoe adapted to move normal to the plane of movement of the film in timed sequence with the advancement of the film across the exposure aperture thereby providing accurate planar positioning of the film relative to the exposure aperture avoiding film misalignment, out of focus exposures, or abrasion of the film or emulsion.

These and other objects and advantages of the present invention will be apparent from a reading of the specification and claims in conjunction with the following drawings in which:

FIGURE 5 is a plan view of the demountable film drive assembly for the apparatus of FIGURE 1;

FIGURE 6 is a sectional view along the line 6—6 of FIGURE 5;

FIGURE 7 is a sectional view along the line 7—7 of FIGURE 5;

FIGURE 8 is a sectioanl view along the line 8—8 of FIGURE 5; and

The present invention relates to so-called shutterless photographic recording apparatus which is adapted to employ unperforated, light sensitive, photographic film, i.e., film not provided with sprocket holes on the opposite, parallel edges. Employment of unperforated film permits the utilization of a much larger area of the photographic emulsion than was heretofore possible. The present novel film drive and advancement means, as hereinafter described in detail, permits high speed, stop-start movement of the light sensitve emulsion into and out of the exposure area, as with conventional sprocket-hole film, without the problem of overlap of frames or undesirable spacing of frames relative to one another and to the exposure aperture.

Figure 1:
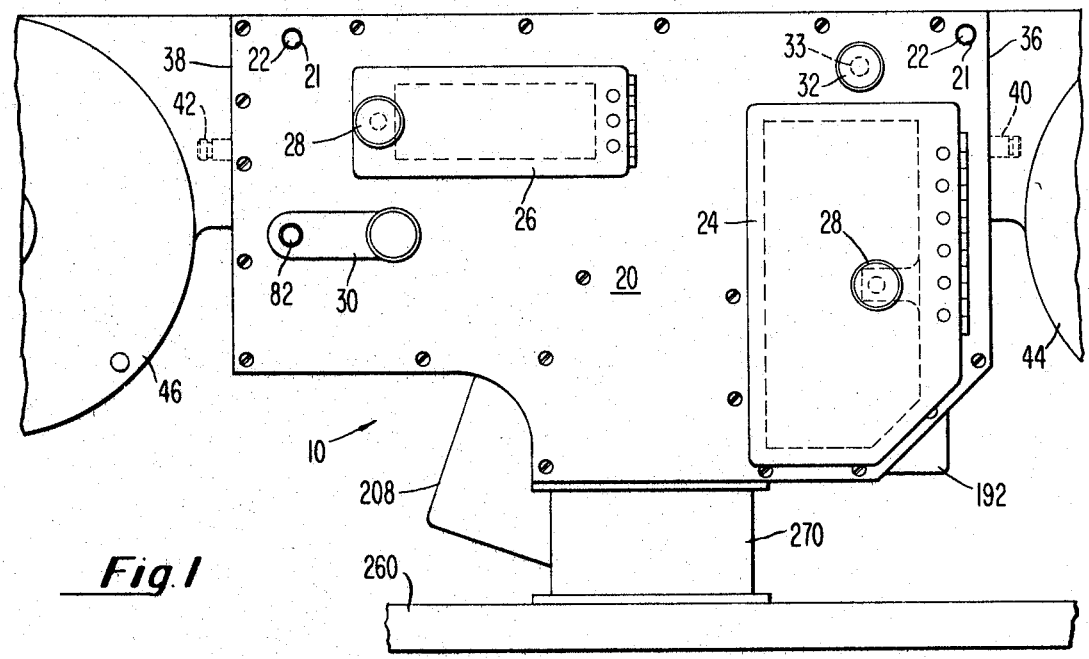
FIGURE 1 is a top plan view of apparatus embodying the present invention.
Figure 2:
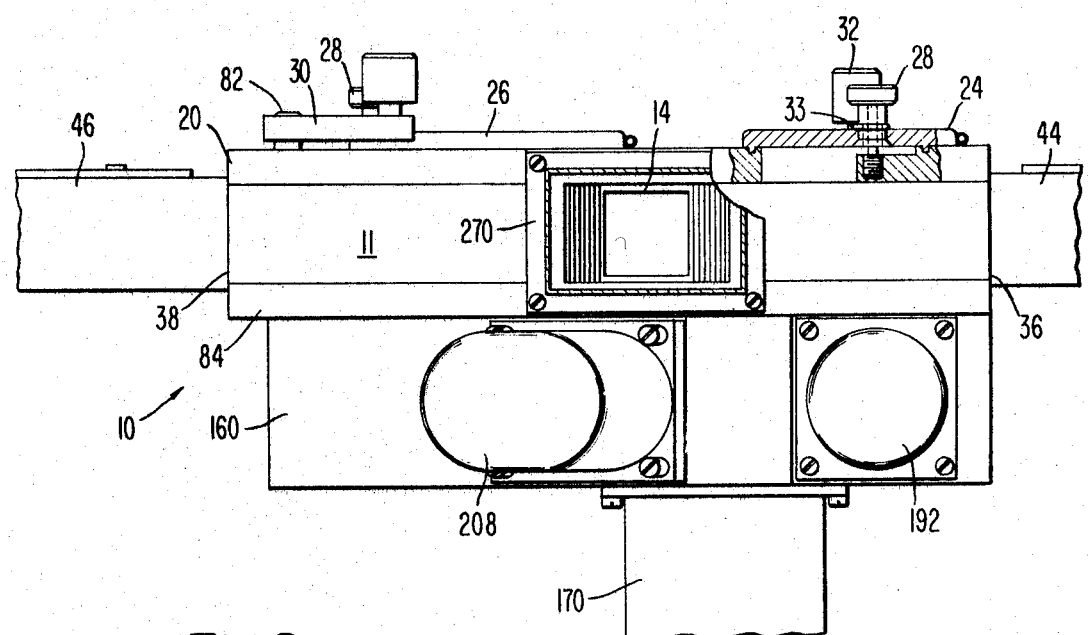
FIGURE 2 is a front elevational view of the apparatus of FIGURE 1.

Photographic recording apparatus 10 embodying the present invention is seen by reference to FIGURES 1 and 2 of the drawings to comprise a rigid, rectangular, box-like member 11, e.g., aluminum casting, provided with an enlarged, central, irregularly shaped recess or chamber 12, having a rectangular exposure aperture or opening 14 parallel with one side of the member 10, and extending into the recess 12. The side walls of the casting leading to the opening 14 are angled outwardly from the opening and are notched or stepped thereby to avoid any reflection of light from outside of the structure 10 into its interior. Slot-like apertures 16 and 18 open into the central recess 12 from opposite upper right and left portions of the member 10. A cover 20, provided with one or more alignment apertures 21 receivable over aligning studs 22 on member 10, encloses the entire area of the member 10 and, except for the opening 14 forms a light-tight enclosure therewith.

Cover member 20 is provided with a pair of hinged hatches 24 and 26 which can be pivotally opened and closed and locked by means of an associated knurled knob 28—28 which provides access to internal mechanism still to be described. A cutter bar lever 30 is provided for purposes described hereinafter. An enlarged knurled knob 32 is secured to a short shaft 33, FIGURE 3, adjacent the larger (24) of the two hatches. This knob 32 is used for applying or releasing spring pressure against the idler roller of the film supply mechanism. Pressure is released to initially hand feed film into the looper arm area.

The opposite end portions 36 and 38 of the member 10 include snap-on mounting means 40 and 42 for securement of enclosed light-tight film supply and take up reels 44 and 46, respectively. The cannister enclosing members 44 and 46 are adapted to be mounted and demounted easily, simply and efficiently by means, e.g., of thumb screws and catches, not shown.

Figure 3:
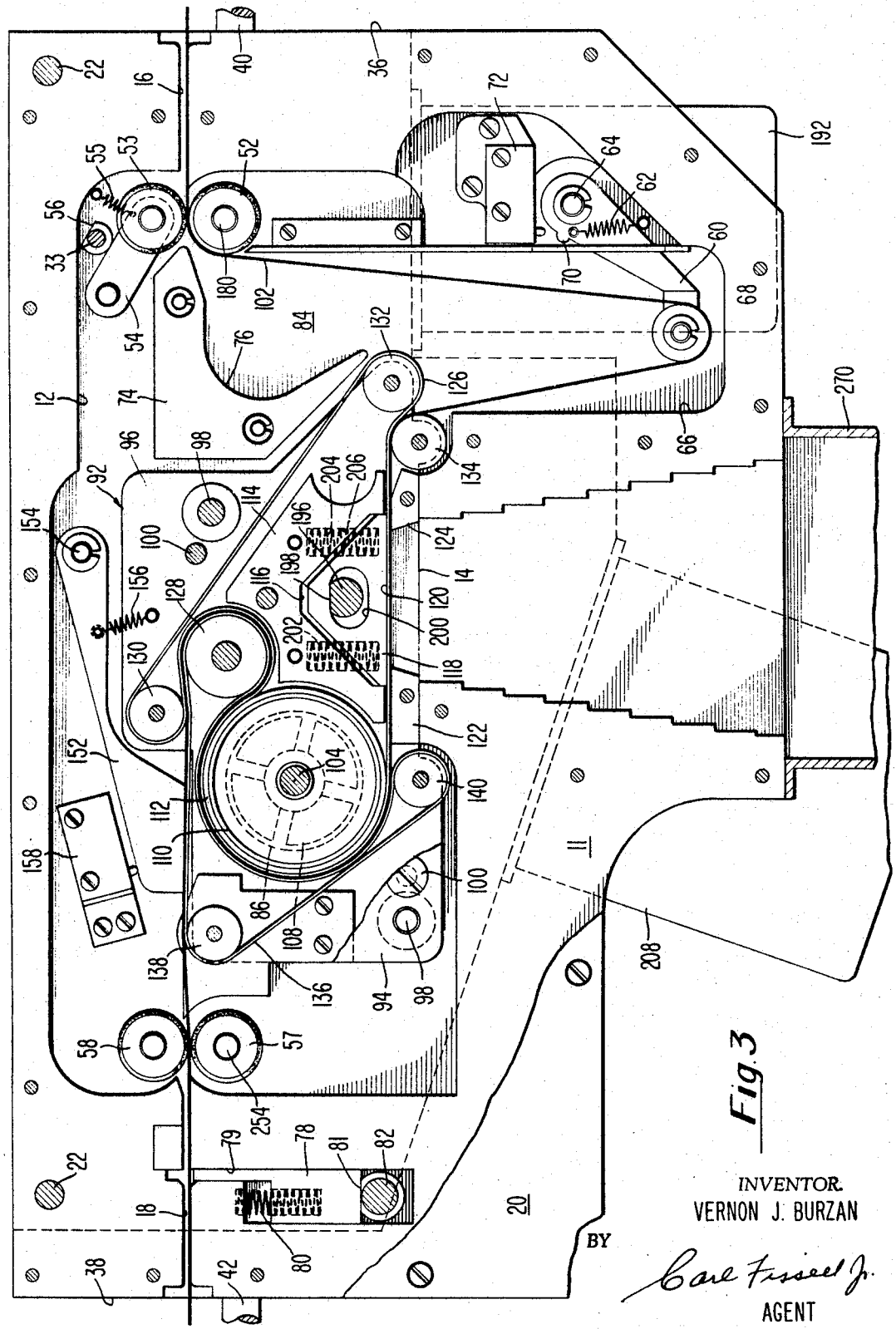
FIGURE 3 is a top plan view of the film drive transport mechanism of the apparatus of FIGURE 1.

An input driver roller 52, FIGURE 3, and an idler roller 53 arranged parallel thereto and in surface contact therewith, are disposed adjacent the input slot or aperture 16 on the right hand side of recess 12.

Roller 53 is carried on the end of a short pivoted link 54 and is biased by a spring 55 away from driver roller 52. Rotation of knob 32 moves the flat 56 against the arm 54 permitting the spring to retract roller 53 from roller 52 for purposes to be described later on herein. An output drive roller 57 and an idler roller 58 in surface contact therewith, are arranged adjacent to slot-like aperture 18 on the left side of the recess 12.

A film tensioning and film supply loop controlling arm 60, biased by a spring 62, extends forwardly from its pivot 64 into the lower chamber extension 66 of recess 12 and carries a grooved plastic pulley 68 rotatably disposed on the end thereof. The opposite end of the looper arm 60 includes means 70 adapted to actuate a film loop control microswitch 72 located within chamber extension 66, for purposes hereinafter set forth.

A rigid, demountable input film loop guide member 74 having a curvilinear polished face 76 arranged adjacent the input drive and idler roller combination is arranged in the recess 12 in a manner to provide a curved path angled in the direction of the film looper arm pulley 60 for purposes which will become more apparent as the description proceeds.

A cutter bar 78 slidable in slot 79 so as to move across the slot-like aperture 18 is biased by spring 80 against the flat 81 of a vertically extending cutting bar shaft 82 engageable with the cutter bar lever 30. Arcuate movement of lever 30 causes the bar 79 to cross the slot 18 thereby permitting the operator to remove exposed film frames from the camera body with no waste of unexposed film.

The bed or floor 84, FIGURES 3 and 7, of the recess 12 is provided with an enlarged circular access opening 86 offset from the exposure aperture 14, for purposes to be described presently.

Arranged to be demountably inserted and removed from the central recess 12 for maintenance, repair and/or replacement is a film drive sub-assembly 92, shown most clearly in FIGURE 5. Upper and lower, oppositely disposed, irregularly shaped, rigid plate members 94 and 96 are spaced apart by means of spacer shafts 98—98 and joined together into a unitary sub-assembly by means of bolts 100—100. Means, as hereinafter described, for advancing photographic film 102 from the demountable supply reel chamber to the demountable take-up reel chamber comprises a central star wheel shaft 104, FIGURE 7, mounted in bearings 106 between plates 94 and 96, and carrying a star wheel 108 at one end thereof and an enlarged star wheel drive roller 110 at its opposite end. A resilient member 112, e.g., rubber tire, surrounds wheel 110 for purposes still to be described.

An irregularly shaped, rigid block 114 forming a pressure pad housing is disposed between plates 94 and 96 and is provided with a triangular or wedge shaped cutout or recess 116 in one face thereof into which a similarly angularly shaped movable film aperture pressure pad member 118, having a substantially flat planar front surface portion 120 thereon, is receivable. A planar wall forming aperture plate member 122, provided with a rectangular cutout or aperture 124 therein, is arranged adjacent the members 114–118 between the plates 94 and 96, so that the peripheral edge portion of the movable member 118 abuts the inner peripheral edge portion or rim of the opening 124.

The member 118 in combination with the member 122 forms a pressure pad and back-up plate operable toward and away from the aperture 124, as hereinafter described, providing a flat rigid surface across which the film 102 is adapted to be advanced adjacent the image aperture 124, in a manner and by means now to be described.

Film advancement or movement is accomplished by means of two relatively thin, tough, flat webs or belts, e.g., metal, fiber glass, fabric, plastic or some suitable combination thereof. A drive belt 126 encircles approximately ⅔ of the rubber covered star wheel drive roller 110 and then passes around an enlarged idler wheel 128 and over an adjustable tensioning idler roller 130 thence to a lower fixed idler roller 132 and back to the star wheel drive roller 110. A rubber covered pressure roller 134, adjacent one side of aperture 124, is disposed adjacent to and slightly below the lower idler wheel 132.

A driven idler web or belt 136 is arranged to partially encircle the star wheel roller 110, passing around the enlarged idler roller 128 and then around an adjustable tensioning idler roller 138, around a lower idler 140 adjacent the opposite side of aperture 124 and thence back around the star wheel drive roller 110.

Each of the tensioning rollers 130 and 138 is adjustably biased by means of a short shaft 142, the forward end of which engages a flat 143 on the respective roller mounting shaft 144 and is placed under tension by means of a coiled spring 145 and a back-up shaft 146 causing the rollers to be pressed leftwardly, FIGURES 5 and 6, so as to prevent any "slack" in belts 126 and 136. This means is effective to maintain the belts under sufficient tension to prevent any slippage as they move around their respective drive and idler rollers, as hereinafter described.

Oppositely disposed aligning and orienting studs 148, projecting outwardly from the lower plates 96 of assembly 92, are receivable within respective shallow apertures in the floor or bed 84 of recess 12. The studs 148 permit the assembly 92 to be located within a shallow subrecess 150 in recess 12 so as to align aperture 124 with aperture 14 in member 10.

An enlarged, flat, film pad or shoe 152, upper center of FIGURE 3, is rockably disposed in the film path so as to overlay the upper flat exposed area of belt 136. The pad 152 is pivoted at one end on a short shaft 154, accessible through hatch 26 and is biased by means of spring 156 into engagement with the film 102 as the latter leaves the bight between rollers 128 and 130 and the two belts 126 and 136. A microswitch 158, located so as to be activated as a result of the vertical rocking movement of the pad 152, acts as a sensing mechanism for indicating to other associated electrical apparatus, film breakage, absence of film at this location in the assembly, etc.

A film path is thus provided for film 102 from the supply reel 44 between the rollers 52 and 53 around the film looper roller 68 in between the rollers 132 and 134 across the aperture 124 (with the film emulsion side facing toward the aperture), in between the two belts 126, and 136, around the drive roller 110, around roller 128 past roller 130 and between the pad 152 and belt 136, in between rollers 57 and 58 to discharge onto the take up reel 46.

Figure 4:
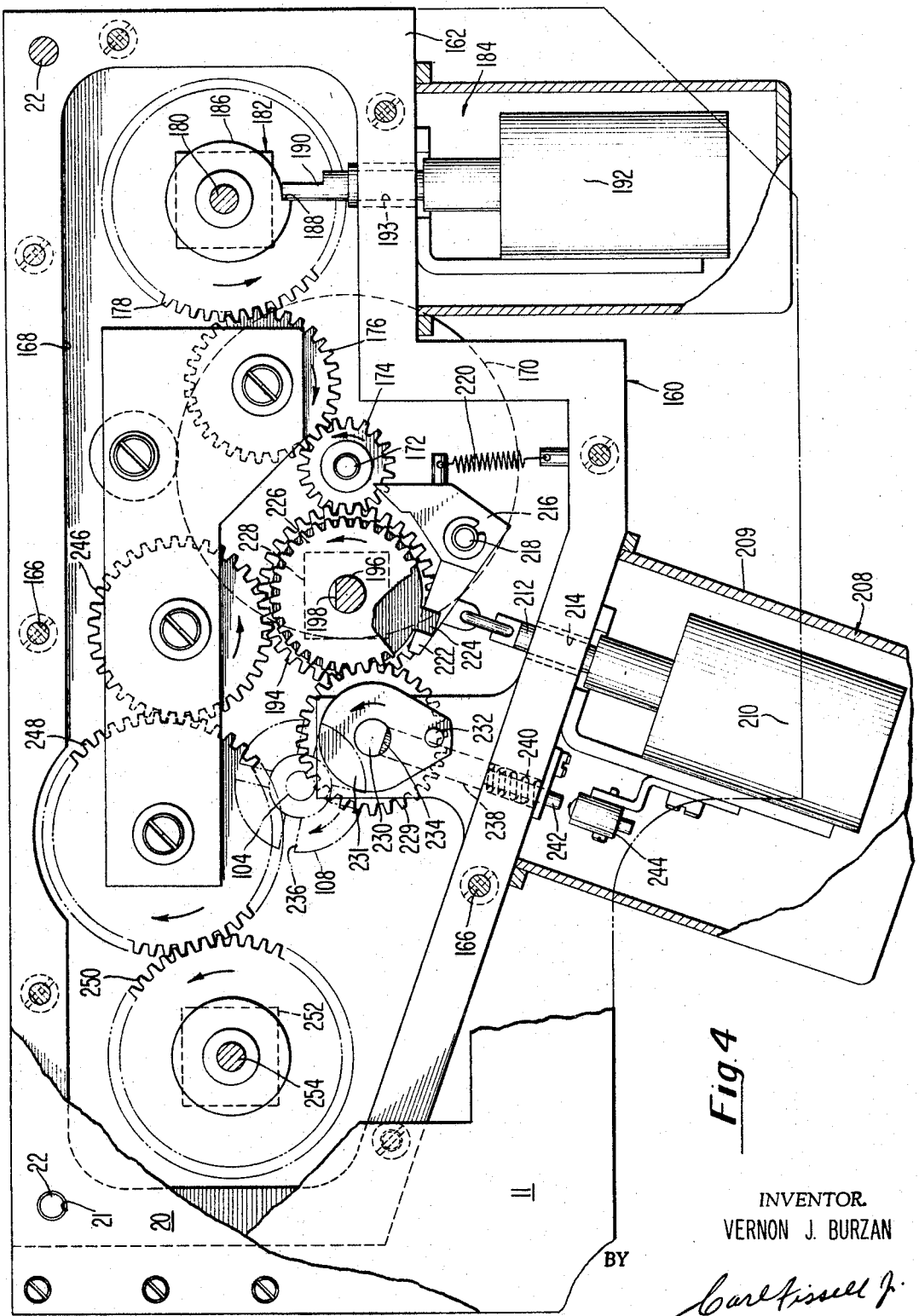
FIGURE 4 is a top plan view of the drive gear train, control clutches and shaft couplings for the apparatus of FIGURE 1.

A gear box assembly 160 for incrementally advancing or indexing the film 102 relative to the exposure aperture 124 is seen by reference to FIGURE 4, to include a frame 162, e.g., a casting of aluminum or other similar rigid material, adapted to be secured to the supporting box frame 11, as by locating pins 22 and bolts 166, in conventional fashion. Frame 162 is provided with an irregularly shaped internal recess or chamber 168 within which, as hereinafter described, a drive gear train is disposed. A main driving motor 170, e.g., operable at a constant speed, e.g., 1550 r.p.m., is attached to the frame 162 and is positioned therebeneath with its output driving shaft 172 projecting vertically upwardly away therefrom and extending into the chamber 168.

A pinion gear 174 on motor drive shaft 172 rotatable in a counter clockwise direction meshingly engages a clockwise rotatable idler transfer gear 176 for trasmitting rotative torque to a large input film drive gear 178 rotating drive shaft 180 of the latter counter clockwise. Shaft 180 is adapted to engage and rotate film input drive roller 52 through the medium of an electromagnetically controlled drive clutch 182 as will be described in more detail hereinafter.

Clutch 182 e.g., Curtiss-Wright clutch type C-45-2 ("On-Off" microswitch actuated for one revolution of shaft 180), is interposed between gear 178 and film drive roller 52 and is effective by means of control 184 to permit the motor continuously to rotate the gear train including gears 174, 176 and 178 while enabling the roller 52 to remain stationary until rotation thereof is called for, as will now be described.

Drive clutch 182 is seen to include an operate cam 186, secured to and rotatable in a counter clockwise direction with shaft 180. A clutch detent 188 cut into the periphery of cam 186 is engageable with an actuating plunger 190 of a clutch control solenoid 192 slidably movable through an aperture 193 in wall 162. Energization of solenoid 192 causes plunger 190 to be withdrawn from engagement with detent 188 permitting rotation of shaft 180 and film drive roller 52 for purposes to be explained presently.

Adjacent to and in mesh with drive gear 174, on the left side thereof, FIGURE 4, is a large helical gear 194 rotatable in a clockwise direction and carried upon a vertically projecting drive shaft 196, the latter being provided with a flat portion 198 receivable in elliptical aperture 200 in film pressure plate 118. Pressure plate or pad 118 is biased in one direction, e.g., toward the exposure aperture 124, by means of a pair of spaced, parallel, oppositely disposed springs 202-202, FIGURE 3, retained in axially aligned apertures 204-206 in blocks 114 and 118, respectively. Flat 198 on shaft 196 in combination with elliptical aperture 200 provides positive means (eccentric action) for retracting pad or block 118 away from the aperture 124 against spring tension a slight distance e.g., 1/16 inch, for each revolution of shaft 196 thereby permitting the film 102 to be advanced across the aperture by the film advancing drive means hereinbefore described.

Incremental, intermittent movement of shaft 196 is accomplished by means of a one revolution clutch control mechanism 208 enclosed in the shroud 209. A solenoid 210 for actuating this clutch is provided with a plunger 212 reciprocably, slidably, movable into and through an aperture 214 in the side wall of casting 162 to engage the longer arm of an L-shaped clutch control member 216 pivoted on shaft 218. The opposite or shorter arm is biased clockwise by a spring 220. The forward end of the long arm carries a projection 222 operably engageable with a detent lug 224 located on and projecting away from a spur gear 226 secured to and rotatable with shaft 196.

A single revolution clutch (dotted outline 228) e.g., Hillard type, is interposed between larger gear 194 and spur gear 226 on shaft 196 thereby permitting the motor to rotate the large gear at a constant rate while the spur gear remains stationary until an exposure of film 102 is called for, as hereinafter described, at which time solenoid 210 and clutch 208 are energized to cause the spur gear and shaft 196 to rotate one revolution. Spur gear 226 and control arm 216 also provide a control mechanism for actuation of the film drive assembly 92 by means, as will now be described.

A Geneva spur gear 229 in driving mesh with spur gear 226 and rotatable on shaft 230 in a counter clockwise direction, carries a Geneva plate 231 provided with a Geneva actuating pin 232 projecting upwardly therefrom. Shaft 230 has a flat portion 234 coextensive therewith for purposes to be explained herein presently. Geneva pin 232 is receivable in one of the quadrantal slots 236 in star wheel 108 for transmitting rotative torque from shaft 230 to the star wheel thereby to advance the two belts 126-136, as earlier described herein.

The forward end of a horizontally disposed plunger 238 slidable back and forth through an opening 240 in the wall of casting 162 is adapted to engage the flat 234 on shaft 230. The rearward, reduced end portion 242 of plunger 238 is arranged to trip or actuate a microswitch 244 operably, electrically connected to other associated electrical circuitry and effective when energized to indicate that the clutch 228 is engaged for one revolution and that film was advanced thereby.

In mesh with gear 194, which derives rotative torque from main drive gear 174, is a transfer idler gear 246 rotatable counter clockwise in meshing engagement with a larger idler gear 248, the latter operably engaging and driving film output drive gear 250. Film output drive roller 57 is coupled, via a spring loader, cork faced, overrunning friction clutch (dotted outline 252), to shaft 254 of drive gear 250 and is adapted to rotate intermittently or as called for as a result of the variation in the coefficient of friction on the clutch as the film tends to bunch up or gather slightly as it exits from the drive belts on its way to the output or take-up reel. So long as the film 102 is taut or tight, the clutch will slip. However, as soon as any slack appears in the film, the clutch plates will engage and drive the film onto the take-up reel.

The present invention finds application among other things, in a high-speed computer-linked information storage and retrieval system wherein computer logic and associated control apparatus is adapted to provide a plurality of intelligible information outputs including visual symbols, characters, lines, etc., which are or may be displayed upon the face of an associated electronic storage and display apparatus.

Figure 9:
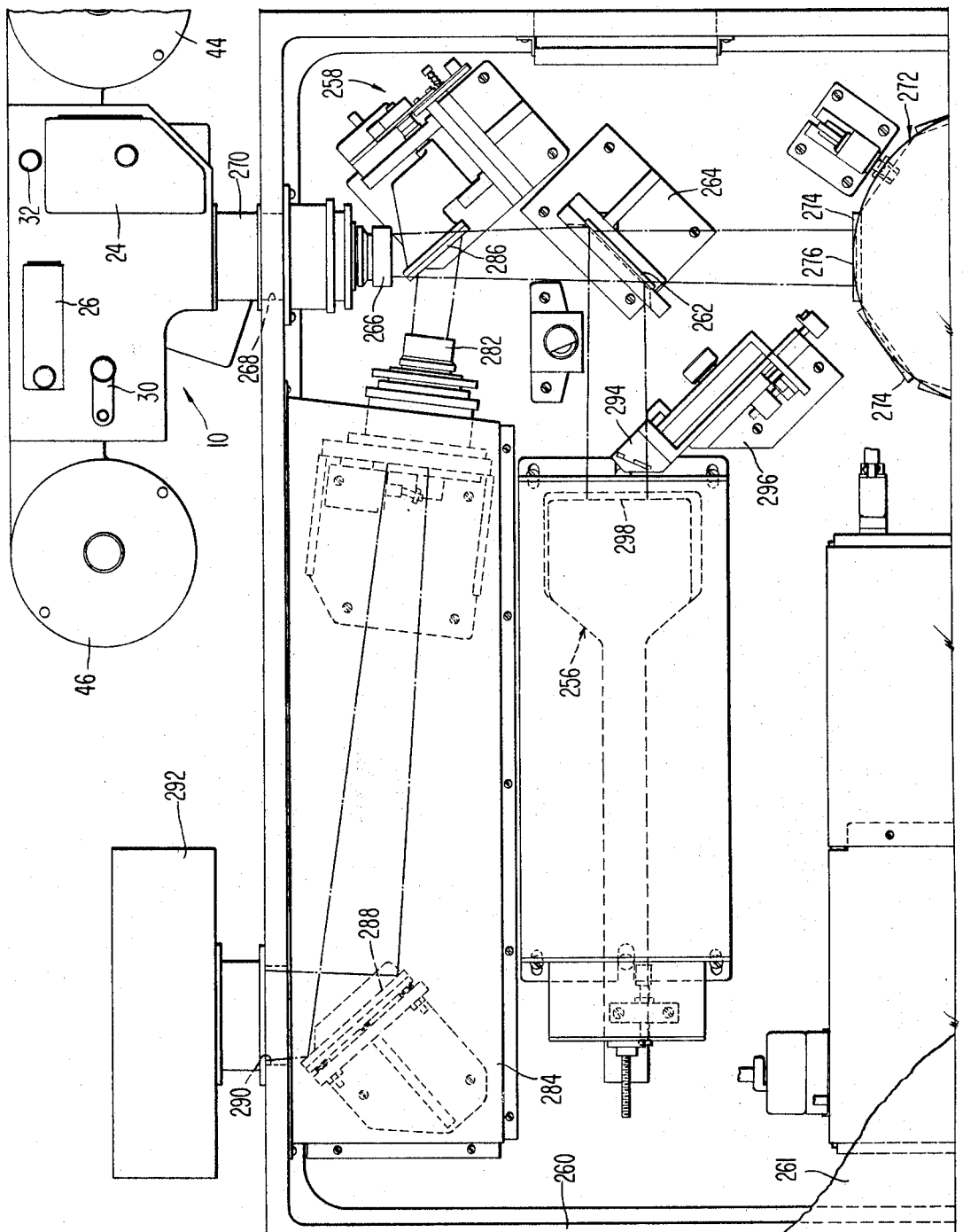
FIGURE 9 is a view, on a greatly reduced scale, of the apparatus of the present invention in a system environment.

The hereinbefore described photographic recording apparatus 10 is operably associated with a cathode ray tube storage and display device 256, FIGURE 9, by means of an optical bench assembly 258 housed in large rectangular container 260 and including a cover 261 forming a light-tight enclosure.

A high efficiency optical system is employed and is seen to include a beam splitting mirror assembly 262, demountably disposed on a mirror mount 264, adjacent to and with the mirror center-line aligned with the center-line of cathode ray tube 256. Mirror 262 is also aligned with a focusing lens assembly 266 secured adjacent to an aperture 268 in the upper right hand wall portion of the chamber 260. The previously described recording camera apparatus 10 is adapted to be attached to the upper wall of the chamber 260 with the photographic apertures 14 and 124 in register or alignment with the aperture 268 in the assembly 258. A light-tight tube 270 connects the recording camera to the optical bench.

Located on the optical center-line of the lens 266 and the mirror 262 is a movable e.g., rotatable assembly 272 the outer periphery of which is adapted to carry one or more demountable photographic slide or plate carriers 274 within which a photographic slide or plate 276 providing desired overlays, i.e., graphs, forms, maps, etc., is or may be mounted. Suitable means not shown, is provided to permit the assembly to be rotatably indexed as desired, so as to selectively place different ones of the slides in position to have the image thereof transmitted through the beam splitter 262, lens 266, onto the film 102, in camera 10 at each exposure thereof.

A second focusing lens assembly 282 is arranged in a secondary light-tight demountable housing 284 adjacent to lens 266 and arranged so that the image on the cathode ray tube 256 is reflected from mirror 262 to a pivotally mounted mirror assembly 286 through lens 282 to a mirror 288 and through an aperture 290 in the upper left portion of the wall of assembly 258. Self developing image forming photographic apparatus 292, e.g., Polaroid Land Camera® is or may be positioned with its lens and hood adjacent to the opening 290 effective to make instantaneous exposures of the information on the CRT during the recording thereof by the recording apparatus 10.

The assembly 294, adjustably pivotally mounted on a base 296 and operably movable into the optical path of the CRT 256 is or may be utilized for coding microfilm as such application demands.

Assuming that it is desired to make a photographic recording of information or data which is being presented on the cathode ray tube 256, the recording camera assembly 10 is attached to the light-tight chamber 260 with the tubular structure 270 in place against the wall of the chamber 260 surrounding aperture 268. Thereafter, a fresh load of film 102 is placed in the supply chamber which is attached to the camera by means hereinbefore described and the take-up reel and chamber is attached to the opposite side of the camera by means also before described. A length of film is fed out from the supply reel into and through the input slot 16. The knurled knob 32 is rotated to cam roller 53 away from the roller 52 so the film can be fed in between rollers 52 and 53 and into the chamber extension 66 so as to pass around the looper roller 68 thence in between rollers 132 and 134 of the drive assembly 92. At this point, the drive motor may be energized placing the drive train in continuous operation. The film with its emulsion side facing the aperture 14 is then fed across the aperture plate in between roller 140 and around star wheel drive roller 110. The film indexing clutch 208 is then energized causing the star wheel drive to rotate, indexing the film a frame at a time past the exposure aperture. This operation is or may be continued until sufficient film has crossed the aperture and passed under the pressure shoe 152 and in between output rollers 57 and 58 exiting through output slot 18 into the take-up reel chamber on the left side of the camera assembly.

The focusing of the optical system is dependent on the electrical and mechanical portions of the apparatus. The electrical portions of the focus procedure is accomplished by adjusting the intensity control which governs the amount of light at the face of the CRT and the fundamental spot size or electron beam width which in effect, governs the over-all resolution on the face of the CRT. If it is assumed that the alignment of various mirrors has been completed by a previous exercise then the mechanical focusing involves the camera 10, the CRT and the carrousel 272. The camera does not contain its own lens system but instead has a fixed aperture. The carrousel contains a series of overlay plates 274 each of which can be indexed into the lens center-line. The position of these overlays is fixed with respect to the film plate of the camera.

To focus the image of the carrousel overlay onto the film, a right angle prism is placed over the aperture at the film plane. The bottom of the prism has a focus reference outline glued to it to establish where the film plane actually is. This reference is viewed through a microscope. Light is shown through the carrousel overlay up to the film plane, through a lens, and through the prism so that the image of the carrousel overlay can be compared with the image of the focus reference. The lens focal length can be varied to obtain a sharp image at the film plane as observed through the microscope. This then establishes the system focal length.

The position of the CRT face is located by the following procedure:

(a) A sharp image is first presented electrically on the face of the CRT.

(b) A light is then shown through the prism, down through the lens to the beam splitting mirror and over to the CRT.

(c) The image of the focus reference on the prism is presented on the face of the CRT. The CRT is moved left or right to focus this image. This is a course adjustment.

(d) The final adjustment is made by moving the CRT in slight increments relative to the course adjustment position and viewing film samples when the camera and system are in operational mode.

The image to be photographed which appears on the face of the cathode ray tube 256 is first focused onto the film planes of the two camera assemblies.

After the focusing has been accomplished by means of lenses 266 and 282, etc., information to be recorded is fed to the cathode ray tube and the recording operation is initiated. It is noted in this arrangement that only the central rectangular area 298 of the cathode ray tube screen is utilized for recording purposes and that the optical bench assembly including the various mirrors involved are aligned with this central portion of the CRT.

Inasmuch as the present apparatus is normally utilized in a free-running, stop-start fashion, it is desirable to be able to check not only the focus but the detail data being recorded by some means other than the photographic film on which the actual recording is being made so that should an error arise it may be corrected quickly and easily without wastage of film. To this end, a self developing camera such, for example, as the Polaroid Land Camera is attached over the aperture 290 by suitable light-tight housing apparatus with the film plane of the camera in focus with the lens 282. Thus, at any point in the operation an instantaneous single frame exposure may be made of the information on the cathode ray tube offering a verification of the data that is being recorded by the recording camera 10.

Assume that the image on the cathode ray tube has been brought to focus through the lens 266 onto the film plane of the film 102, that the drive motor 170 is operational, and that solenoid 210 of the clutch 228 is electrically interconnected to the associated computer apparatus in a manner permitting the computer to signal to the camera apparatus 10 that one or more exposures are to be made. Solenoid 210 is then energized causing the clutch 228 to engage the drive through gear 194 and gears 226 and 229. Shaft 196 rotates lifting the film pressure pad 118 away from drive belt 126 at the aperture 14. Simultaneously, the Geneva pin 230 is rotated counterclockwise engaging one of the slots 236 in the star wheel drive 108 causing the star wheel drive roller 110 to rotate 90° indexing the film past aperture 14 placing a fresh, unexposed frame of film therebefore. An instantaneous exposure is made of the information on the CRT after which the CRT is blanked thus avoiding the need for a shutter assembly to protect the film from unwanted exposure. At the same time, the plunger 238 is reciprocably rocked to engage the contact of the microswitch 244 indicating that an exposure and proper film advance has been accomplished. Concurrently, the film which is above the drive belt 136 adjacent the pressure pad 152 becomes slightly slack due to the fact that there is now an excess of film under roller 130. This causes closure of microswitch 158 indicating that a frame of film has been exposed and that the film has been properly advanced. Simultaneously, the slip clutch 252 engages permitting the drive roller 57 to rotate against the idler 58 feeding the film outwardly into the slot 18 and into the take-up chamber and onto its associated take-up reel.

This operation, as hereinbefore described, continues uninterruptedly so long as there is no film breakage and so long as the computer signals for a frame at a time to be exposed.

As the film advances before the aperture 14, the film looper arm 60 incrementally advances clockwise to a relatively horizontal position until the camming projection 70 on the upper end of the arm 60 engages the actuating mechanism of microswitch 72. At this point, all of the useable film from the lower chamber 66 has entered the drive mechanism to be exposed. Microswitch 72 closes applying a potential to solenoid 192, FIGURE 4. When the solenoid 192 is energized this axially actuates the plunger 190, FIGURE 4, moving it away from the on-off clutch cam surface 188. This clutch turns roller 52 as long as the solenoid is energized. The rotation of idler 52 brings in more film to the compartment 66. As soon as the looper arm returns to its initial position (FIGURE 3) the microswitch 72 is opened and the clutch is disengaged, halting the entry of film through aperture 16.

As noted hereinbefore, the present invention as seen particularly in FIGURE 3 of the drawings, incorporates a number of automatic safe-guards which make the operation of the device more or less fail-safe. For example, while the member 152 is not only effective as a type of pressure pad, it actually performs certain additional functions. During the initial threading of the film into the camera from the supply chamber 46, the member 152 provides a restrictive pathway for the film to follow (i.e., directly to the output rollers 57 and 58). This effectively makes the device self-threading. The switch mechanism associated with the member 152 acts when energized (closed) to indicate film movement. In the event of a malfunction of e.g., rollers 57 and 58, the film will tend to "bunch up" or accumulate under member 152 causing the switch 158 to remain closed. In this latter instance, 152 acts as a safety device to warn the operator to correct the condition.

There has thus been described a novel shutterless recording camera utilizing sprocketless photographic film and operable in continuous, high speed, intermittent fashion including means permitting continuous and accurate monitoring of the film image as it is being recorded from the face of an electronic display device e.g., a CRT, and having the capability of utilizing image overlays to provide additional sources of desired information e.g., weather maps, geographical terrain, columnar or statistical data, etc.

What is claimed is:

1. Photographic recording apparatus for sprocketless film comprising:
   (a) means providing an exposure aperture relative to which photographic film is adapted to be positioned whereby said film is exposed to light from subject matter to be recorded thereon,
   (b) means to linearly entrain said film and move the same in area contact therewith into and out of the area adjacent to said aperture as desired, and
   (c) means to activate said last means effective to advance the film from a supply reel to said aperture thence to a take-up reel whereby said film is exposed while adjacent to said aperture thus to record information relative to said subject matter as a latent image thereon.

2. Photographic recording apparatus for sprocketless film comprising:
   (a) means effective to pass photographic film into and through a light-tight recording area,
   (b) means to advance said film across an exposure aperture in said recording area adjacent to an objective to be photographed,
   (c) said last means including means between which said film is linearly entrained and moved in area contact therewith and an indexable drive means operably associated with film advance means effective thereby to move said film in discrete increments into and out of the exposure area thereby to expose said film to said objective and record a latent image of the latter on the former.

3. Photographic recording apparatus for sprocketless film comprising:
   (a) means effective to pass photographic film into and through a light-tight recording area,
   (b) means to advance said film across an exposure aperture in said recording area adjacent to an objective to be photographed,
   (c) said last means including planar means between which said film is linearly entrained and moved in area contact therewith and an indexable drive means operably associated with film advance means effective thereby to move said film in discrete increments into and out of the exposure area thereby to expose said film to said objective and record a latent image of the latter on the former.

4. Photographic recording apparatus for sprocketless film comprising:
   (a) means effective to pass photographic film into and through a light-tight recording area,
   (b) means to advance said film across an exposure aperture in said recording area adjacent to an objective to be photographed,
   (c) said last means including endless planar means between which said film is linearly entrained and moved in area contact therewith and an indexable drive means operably associated with film advance means effective thereby to move said film in discrete increments into and out of the exposure area thereby to expose said film to said objective and record a latent image of the latter on the former.

5. Photographic recording apparatus for sprocketless film comprising:
   (a) means providing an exposure aperture relative to which said sprocketless photographic film is adapted to be positioned whereby said film is exposed to light from subject matter to be recorded therein,
   (b) endless means linearly entraining said sprocketless film for moving the same in area contact therewith into and out of the area adjacent said aperture as desired, and
   (c) means to activate said endless means to advance the film from a supply reel to said aperture thence to a take-up reel whereby said film is exposed while adjacent to said exposure aperture thus to record information relative to said subject matter as a latent image thereon.

6. Photographic recording apparatus comprising:
   (a) means providing an exposure aperture relative to which sprocketless photographic film is adapted to be positioned whereby the latter may be exposed to light from subject matter to be recorded thereon,
   (b) endless means operable in surface contact for linearly entraining said film so as to advance the latter in area contact therewith into and out of the area adjacent said aperture as desired, and
   (c) means to activate said endless means in a manner causing the film to move from a supply reel to said aperture thence to a take-up reel effective to expose said film while adjacent to said aperture thereby to record information relative to said subject matter as a latent image thereon.

7. Photographic recording apparatus comprising:
   (a) means providing a photographic exposure aperture relative to which sprocketless photographic film is adapted to be moved for exposing the same,
   (b) a pair of endless, flexible, relatively non-resilient members adapted to linearly entrain said film therebetween and move the same in area contact therewith,
   (c) means operably associated with said endless members effective to move the latter in a manner incrementally to advance said film relative to said aperture to expose the same to light forming a latent image of desired information thereon, and
   (d) means adjacent said exposure aperture for maintaining said film normal and in a substantially planar relation relative to said aperture during exposure thereof and being movable away from said film subsequent to said exposure effective to maintain image focus on said film while avoiding abrasion thereof as said film is moved relative to said exposure aperture.

8. Photographic recording apparatus comprising:
(a) a light-tight chamber,
(b) a demountable photographic film drive assembly receivable within said chamber,
(c) said assembly including means to move sprocketless photographic film into and out of said chamber from a supply reel to a take-up reel,
(d) said assembly having an exposure aperture relative to which said film is adapted to be moved thereby to produce a latent image of information desired to be recorded,
(e) means in said assembly adapted to linearly entrain said film and move the latter in area contact therewith relative to said exposure aperture,
(f) means operably associated with said last means effective to actuate the same thereby to advance said film in discrete increments relative to said aperture, and
(g) means responsive to the amount of film remaining in said chamber for energizing said film advance means effective to maintain a continuous intermittent movement of film relative to said exposure aperture.

9. Photographic recording apparatus comprising:
(a) a light-tight chamber,
(b) a demountable photographic film drive assembly receivable within said chamber,
(c) said assembly including means to move sprocketless photographic film into and out of said chamber from a supply reel to a take-up reel,
(d) said assembly having an exposure aperture relative to which said film is adapted to be moved thereby to produce a latent image of information desired to be recorded,
(e) means in said assembly adapted to linearly entrain said film and move the latter in area contact therewith relative to said exposure aperture,
(f) means operably associated with said last means effective to actuate the same thereby to advance said film in discrete increments relative to said aperture,
(g) means responsive to the amount of film remaining in said chamber for energizing said film advance means effective to maintain a continuous intermittent movement of film relative to said exposure aperture, and
(h) automatic means for signalling the advance and advancing additional film into said chamber.

10. Photographic recording apparatus comprising:
(a) a light-tight chamber,
(b) a demountable photographic film drive assembly receivable within said chamber,
(c) said assembly including means to move sprocketless photographic film into and out of said chamber from a supply reel to a take-up reel,
(d) said assembly having an exposure aperture relative to which said film is adapted to be moved thereby to produce a latent image of information desired to be recorded,
(e) means in said assembly adapted to linearly entrain said film and move the latter in area contact therewith relative to said exposure aperture,
(f) means operably associated with said assembly for maintaining said means for entraining said film under suitable tension and tautness,
(g) means operably associated with said means to entrain said film effective to actuate the same thereby to advance said film in discrete increments relative to said aperture, and
(h) means responsive to the amount of film remaining in said chamber for advancing said film advance means effective to maintain a continuous intermittent movement of film relative to said exposure aperture.

11. Photographic recording apparatus comprising:
(a) a light-tight chamber,
(b) means to move photographic film into and out of said chamber,
(c) means in said chamber providing an exposure aperture relative to which said film is adapted to be moved thereby to produce a latent image of information to be recorded thereon,
(d) endless means in said chamber adapted to entrain said film and move the latter relative to said exposure aperture,
(e) means operably associated with said endless means for moving the same effective to advance said film in discrete increments relative to said exposure aperture,
(f) electronic storage and display means operably associated with said exposure aperture and including a relatively short persistence phosphor for displaying information to be recorded upon said film,
(g) means to focus said information onto said film from said display means, and
(h) means for applying energizing and de-energizing potentials to said display means effective to produce substantially instantaneous exposure of the displayed information upon said film prior to advancing the latter for the next exposure.

12. Photographic recording apparatus comprising:
(a) a light-tight chamber,
(b) means to move photographic film into and out of said chamber,
(c) means in said chamber providing an exposure aperture relative to which said film is adapted to be moved thereby to produce a latent image of information to be recorded thereon,
(d) endless means in said chamber adapted to entrain said film and move the latter relative to said exposure aperture,
(e) means operably associated with said endless means for moving the same effective to cause said film to be advanced in discrete increments relative to said exposure aperture,
(f) electronic storage and display means operably associated with said exposure aperture and including a relatively short persistence phosphor for displaying information to be recorded upon said film,
(g) means to focus said information onto said film from said display means,
(h) means for energizing and de-energizing said display means effective to produce substantially instantaneous exposure of the display information upon said film prior to advancing the latter for the next exposure, and
(i) means for projecting an image of additional subject matter to said aperture as an optical overlay to the display information so that the resultant latent image contains information from both the projected and the displayed subject matter.

13. Photographic recording apparatus comprising:
(a) a first light-tight chamber,
(b) means to move photographic film into and out of said chamber from a supply reel to a take-up reel,
(c) means in said chamber providing an exposure aperture relative to which said film is adapted to be moved thereby to produce a latent image of information to be recorded thereon,
(d) endless means in said chamber adapted to entrain said film and move the latter relative to said exposure aperture,
(e) means operably associated with said endless means for moving the same effective to advance said film in discrete increments relative to said exposure aperture,
(f) a second light-tight chamber,
(g) electronic storage and display means in said second chamber operably associated with said exposure aperture and having a relatively short persistence phosphor for displaying said information, (h) means to focus said information onto said film from said display means, (i) means for energizing and de-energizing said display means to produce substantially instantaneous exposure of said latent image upon said film prior to advancing the same for the next exposure, and, (j) light-tight means interconnecting said first and second chambers.

14. Photographic recording apparatus comprising:

(a) a first light-tight chamber, (b) means to move photographic film into and out of said chamber from a supply reel to a take-up reel, (c) means in said chamber providing an exposure aperture relative to which said film is adapted to be moved thereby to produce a latent image of information to be recorded thereon, (d) endless means in said chamber adapted to entrain said film and move the latter relative to said exposure aperture, (e) means operably associated with said endless means for moving the same effective to advance said film in discrete increments relative to said exposure aperture, (f) a second light-tight chamber, (g) electronic storage and display means in said second chamber operably associated with said exposure aperture and having a relatively short persistence phosphor for displaying said information, (h) means to focus said information onto said film from said display means, (i) means for energizing and de-energizing said display means to produce substantially instantaneous exposure of said latent image upon said film prior to advancing the same for the next exposure, (j) light-tight means interconnecting said first and second chambers, and (k) means in said second light-tight chamber for displaying information from said storage and display means onto a self developing camera assembly effective to produce an instantaneous recording of said information.

References Cited
UNITED STATES PATENTS

| | | | |
|---|---|---|---|
| 2,944,109 | 7/1960 | Evans | 178—6.7 |
| 3,328,522 | 6/1967 | Stone | 178—6.7 |
| 3,333,058 | 7/1967 | Goldmark | 178—6.7 |

ROBERT L. GRIFFIN, *Primary Examiner.*

H. W. BRITTON, *Assistant Examiner.*